United States Patent Office 2,976,178
Patented Mar. 21, 1961

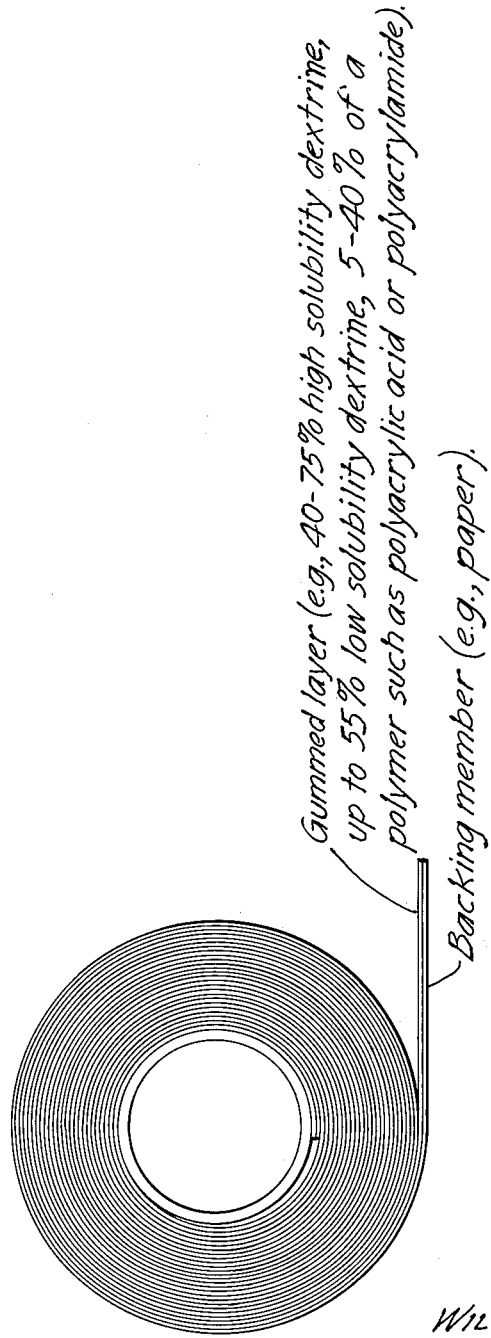
INVENTORS
WALTER H. PAHL
WILLIS A. SANDHOLTZ
NICHOLAS R. ELERTS
RICHARD E. GOGGIN
BY
Carpenter, Abbott, Coulter & Kinney
ATTORNEYS

2,976,178

GUMMED PAPER

Walter H. Pahl, Falcon Heights, and Willis A. Sandholtz, St. Paul, Minn., and Nicholas R. Elerts and Richard E. Goggin, Chicago, Ill., assignors, by mesne assignments, to Minnesota Mining and Manufacturing Company, St. Paul, Minn., a corporation of Delaware Filed Apr. 22, 1957, Ser. No. 654,143

10 Claims. (Cl. 117—122)

This invention relates to gummed sheet materials and tapes, and more particularly, to gummed sealing tapes and other gummed paper products.

Of gummed tape products presently marketed, those employing an animal glue gum layer have been widely accepted by consumers for sealing purposes, as in the sealing of folded flaps of cardboard cartons and the like. For such sealing uses, a particular combination of properties is required in the gummed tape. For example, it must rapidly gain tack when water activated (initial adhesion), and retain this tack for a reasonable period of time (delayed adhesion) so that minor delays in applying it to a carton do not cause sealing tape failure on the resulting package. When water activated and applied to the meeting edges of folded flaps of a cardboard carton, the tape should adhere tenaciously even prior to drying and hold the folded flaps in position against the shear forces exerted against the seal by the tendency of the folded flaps to open to their original unfolded condition (wet shear strength). After being placed in position over the flaps of a carton, and allowed to dry, the tape should form seals of high adhesive and shear strength, and thus continue to effectively perform its sealing function.

In addition to the foregoing, under ordinarily encountered conditions of temperature and humidity, the gummed sealing tape should not block when shipped or stored in roll form, or as sheets stacked one on top of another, even though in such structures the water-activatable gummed layer of one sheet is in direct contact with the backing of an adjacent sheet.

One of the primary objects of this invention is to provide the art with a new economical improved gummed sealing tape satisfying all of the aforenoted requirements, as demanded by the users of such articles, without the necessity of employing expensive and otherwise undesirable animal glue (animal glue being subject to molde, etc.) as the gummed layer of the product. A further object is to prepare gummed paper products of improved properties for use as gummed labels and the like.

The drawing made a part hereof illustrates in end view a roll of gummed tape formed according to this invention.

We have found that improved gummed sealing tape sheet articles and tapes can be formed in an economical manner, as required, by coating paper backing materals and the like with a uniform layer of a particular critical combination of three well-known ingredients, even though each of the ingredients individually is unsatisfactory for use in the formation of a practical and economical gummed layer for sealing tape. These three essential ingredients are polyacrylic acid and two different types of dextrines.

In the case where the damanding requirements for gummed sealing tapes are somewhat relaxed, as for example in the case of gummed label papers, we have found that it is suitable to omit one of the dextrines from our composition, if desired, and yet obtain a resulting product of improved properties for gummed label usage.

Dextrines are widely known as gum-type adhesives and have been used in the preparation of gummed sheet articles such as postage stamps. None of these gummed sheet articles, however, as well recognized in the art, possesses the requisite balance of properties for high strength rapid bonding action as required in sealing tapes.

There are two classes of dextrines which are commercially available and which are of particular interest in the practice of this invention. In one class are those dextrines which are highly soluble in water, being at least 90% or more soluble at 77° F., and exhibiting very low viscosities in water solution, i.e., viscosities below 50 centipoises Brookfield at 100° F. and at 30% solids concentration. Some dextrines of this high solubility class may have branch chain structures present; however, the molecular structures of most of the dextrines of this class have essentially linear chains of carbohydrate building blocks. Typical dextrines of this high solubility class are prepared by the acid torrefication of ordinary corn starch, tapioca starch, etc.

The other class of commercially available dextrines of interest are those which are relatively insoluble in water, being only up to about 15% soluble in water at 77° F. These dextrines are usually highly branched and their molecules consist of predominantly branched chains of carbohydrate building units. Some commercially available tapioca dextrines are illustrative of the dextrines of this class; however, similar relatively insoluble branched chain products are prepared on a commercial scale using corn starch as the starting material.

In determining the solubility of a dextrine so as to classify it as aforedescribed, we mix 25 grams of dry dextrine material with 250 milliliters of water at 77° F., shake the mixture periodically until equilibrium between the dissolved and undissolved portion is reached, and then add an additional 250 milliliters of water at 77° F. to bring the total water to 500 milliliters. The resulting mixture is shaken and tested at intervals until constant values are obtained, the test being as follows: After allowing a period of time for undissolved dextrine to settle out the mixture, a 50 milliliter aliquot portion of the supernatant liquor is withdrawn and its water evaporated to determine the weight of dextrine dissolved therein. Calculations are then made to determine the percent of solubility exhibited by the dextrine.

The high solubility dextrine should be used in amounts between about 40 and 75 weight percent of the total composition used in making our gummed layers for sealing tape, whereas the low solubility dextrine is needed in amounts up to about 55 weight percent of the composition, preferably between 10 and 50 percent of the composition. For gummed label usage, however, we may omit the low solubility dextrine component aforenoted and employ as much as 95% of the high solubility dextrine in the gummed layer of the product with satisfactory results.

Individual dextrines of uniform and regular molecular structure which exhibit a solubility intermediate the extremes aforenoted have not been found suitable for the preparation of our gummed sealing tape product; however, mixtures of different classes of dextrines, which mixtures may exhibit solubilities intermediate the foregoing extremes as determined by the solubility test aforenoted, may be used in the manufacture of our gummed sealing tape product. Such mixture, however, must contain the approximate aforenoted proportions of high and low solubility dextrine material in order to be suitable for the preparation of our product.

Only between about 5 and 40%, preferably between 10 and 25%, by solids weight of polyacrylic acid is employed in the composition for the gummed layer of the products hereof.

Our experimentation indicates that the total amount of polyacrylic acid and low solubility dextrine in our gummed layer composition for sealing tapes must be maintained within the limits of about 25 to 60% of the composition for performance properties satisfactory for gummed sealing tapes. Thus, where only about 10% polyacrylic acid is used, about 15% low solubility dextrine must be used and a maximum of about 50% can be used to produce satisfactory results for sealing tape use. The fact that, for the gummed layer of sealing tapes, less low solubility dextrine is needed where larger amounts of polyacrylic acid are employed is a phenomenon not fully understood. Logically, one would not expect such a relationship to arise inasmuch as the properties of polyacrylic acid and low solubility dextrine are widely divergent, e.g., one is soluble in water, the other relatively insoluble.

For purposes of illustrating this invention but not as limitative thereof, the following examples, wherein parts are by weight unless otherwise specified, are offered:

*Example 1*

| | Percent |
|---|---|
| Polyacrylic acid | 15 |
| High solubility dextrine | 51 |
| Low solubility dextrine | 34 |

An aqueous solution of the polyacrylic acid employed had a Brookfield viscosity, at 77° F. and about 16% concentration, between 4,000 and 16,000 cps. The polymer had an intrinsic viscosity between about 0.4 and 0.64. Intrinsic viscosity was calculated in a way well known to polymer chemists from dilute solution viscosity measurements of the polymer in 0.1 normal aqueous potassium chloride at 30° C.

The high solubility dextrine was obtained from Corn Products Refining Company, Chicago, Illinois, under their designation "Dextrine No. 8031" and is prepared by the acid torrefication of ordinary corn starch. It is approximately 97% soluble in water at 77° F., and exhibits a pH between about 3.1 and 3.3. It is light canary yellow in color and containing about 2.5% reducing sugars (dextrose). At a concentration of about 3 parts of this dextrine to 7 parts water, it shows a Brookfield viscosity at 100° F. between 25 and 30 cps.

The low solubility dextrine was obtained from National Starch Products, Inc., Chicago, Illinois, under their designation "Amioca 85," and is a starch degradation product made from "waxy maize." It is approximately 1% soluble in water at 77° F. and has a reducing sugar content (dextrose) of approximately .5% maximum. In color it is white to "off-white."

The foregoing three components were blended together in water solution, using just sufficient water to maintain all components in suspension or solution. The blend was coated upon a kraft paper backing at a coating weight sufficient to provide about 6.5 to 7.5 pounds of dry adhesive solids for each folio ream or equivalent of kraft paper. A folio ream consists of 500 sheets of 17 x 22 inches paper and is the equivalent of about 144 square yards (1296 sq. ft.) of surface area. After coating, the water was evaporated from the coated material leaving a dry non-tacky film which could be readily activated to tackiness by moistening with water, but which did not block or stick to the backing of adjacent sheets even though stored for several months in stacked form with the gummed layer of one sheet contacting the uncoated kraft paper backing of an adjacent sheet.

In use as a sealing tape, this gummed paper rapidly gained tack on water activation, adhered tenaciously to kraft paper board of the type used in packaging, and provided a strong seal between the meeting edges of folded flaps of the carton. Even while wet, the tape held the flaps in folded position against the shear forces exerted by the tendency of the flaps to spring to their original unfolded condition. When activated and held in open air for several seconds prior to applying it to the folded flaps of a carton, the tape retained tack and provided a strong seal upon application.

*Example 2*

The ingredients of Example 1 were compounded in the following proportions and coated on kraft paper with a dry coating weight of about 6.5 to 7.5 pounds of solids per ream:

| | A | B | C | D |
|---|---|---|---|---|
| | Percent | Percent | Percent | Percent |
| Polyacrylic acid | 5 | 10 | 20 | 40 |
| High solubility dextrine | 47.5 | 65 | 48 | 40 |
| Low solubility dextrine | 47.5 | 25 | 32 | 20 |

Tests on products B and C gave results similar to those obtained in testing the product of Example 1 indicating that they each were very suitable products for use as sealing tapes. In the case of products A and D of this example, tests indicated that while they are suitable for use as a sealing tape, their adhesion characteristics are on the border line of being suitable, and it is preferable to employ one of the other compositions hereof for sealing use.

*Example 3*

Two different gummed sheet products were prepared using the composition of Example 1 except that in one case the polyacrylic acid of Example 1 was replaced by a polyacrylic acid having an intrinsic viscosity of between about 0.9 and 1.0 and in the other case with a polyacrylic acid having an intrinsic viscosity between about 1.2 to 1.4. Both of these gummed sheet products exhibited performance properties in all respects satisfying all the requirements for gummed sealing tapes.

*Example 4*

As an illustration of an unsatisfactory combination of one dextrine with polyacrylic acid, 85 parts of the low solubility dextrine of Example 1 and 15 parts of polyacrylic acid of that example were compounded and coated on kraft paper with a dry coating weight of about 6.5 to 7.5 pounds per ream. Tests on the product showed it to be unsatisfactory as a sealing tape, particularly because of its extremely poor delayed adhesion characteristics. Very small additions of the high solubility dextrine to this mixture failed to improve it suitably for use as the gummed layer for sealing tapes according to this invention.

*Example 5*

The proportions of materials and the polyacrylic acid set forth in Example 1 were employed. The high solubility dextrine of Example 1, however, was replaced by a canary yellow 100% tapioca dextrine obtained from the Manhattan Paste and Glue Company of Chicago under their trade designation "Dextrine No. 819." This dextrine is about 99% soluble in water at 77° F., has a maximum reducing sugar (dextrose) content of 4%, and exhibits, at 100° F. and 30% concentration in water, a viscosity of 25 to 30 cps. Brookfield.

The low solubility dextrine of Example 1 was also replaced by a different material in the formation of the product of this example. Here an egg white 100% tapioca dextrine material was used. This particular dextrine was obtained from Stein-Hall Manufacturing Company of Chicago under their trade designation "Tenace 380R." It has a maximum solubility in water at 77° F. of 9.5%, and contains only a trace of reducing sugars.

The composition was blended and coated on kraft paper at a coating weight of about 6.5 to 7.5 pounds per ream (dry solids basis). After drying, the gummed product was wound into rolls. This tape product performed in all respects similarly to the product of Example 1, and represents a further example of an improved gummed sealing tape prepared according to this invention.

*Example 6*

The high solubility dextrine of Example 5 and the polyacrylic acid of that example were compounded in the following proportions and coated on kraft paper with a dry coating weight of about 6.5 to 7.5 pounds of solids per ream:

|  | A | B | C |
| --- | --- | --- | --- |
|  | Percent | Percent | Percent |
| Polyacrylic acid | 5 | 15 | 40 |
| High solubility dextrine | 95 | 85 | 60 |

All of these products were tested as gummed labels and found to exhibit rapid tackiness on water activation and improved adherence (adhesive strength) to fibrous surfaces such as those of paperboard over any dextrine label product known to us.

Polyacrylic acid is preferred in the compositions for the gummed layer hereof, as illustrated; however, instead of polyacrylic acid, polyacrylamide may be employed where slightly lower wet shear strength for the resulting tape may be acceptable. Polymethacrylamide as a replacement for polyacrylic acid, however, has not been found suitable inasmuch as the resulting product in such cases exhibits, among other disadvantages, extremely slow and unsuitable initial development of tack on water activation. In the practice of this invention, therefore, acrylyl polymers having a plurality of polar, hydrophilic, carbonyl-containing groups (such as polyacrylic acid and polyacrylamide) are to be distinguished from other polymers of the acrylic family (e.g. polymethacrylics).

While the dry coating weights of the gummed layers of the various examples above are on the order of 6.5 to 7.5 pounds per ream, dry coating weights varying from about 5 to 15 pounds per ream will be found suitable for the production of practical gummed sealing tapes according to this invention.

In general, flexible fibrous cellulosic materials such as paper are preferred for gummed layer backings for reasons of economy, but cloths, various flexible laminates of paper and other materials, as well as flexible films and the like may be used, if desired.

Our invention, in the preferred embodiment thereof, finds particular utility in the field of sealing carboard cartons and the like, as aforediscussed, but the gummed sheet products and tapes hereof may be employed, in general, in any application where the use of gummed papers, labels, tapes, etc., is desirable.

This application is a continuation-in-part of now abandoned application Serial No. 451,717, filed August 23, 1954, by Walter H. Pahl, Willis A. Sandholtz and Nicholas R. Elerts.

That which is claimed is:

1. A flexible gummed sheet product exhibiting high adhesive strength and comprising a flexible fibrous sheet backing member and a normally non-tacky gummed coating thereon, the dry coating weight of said coating being from 5 to 15 pounds per ream, said coating being rapidly activated to tackiness by water-moistening and comprising by weight up to 95% of high solubility dextrine (a) exhibiting a viscosity below 50 centipoises Brookfield at 100° F. and 30% solids concentration in water, and (b) exhibiting a solubility of at least 90% in water at 77° F., and between 5 and 40% of water-soluble acrylyl polymer selected from the group consisting of polyacrylic acid and polyacrylamide, said dextrine and acrylyl polymer being uniformly blended in said gummed coating.

2. A flexible gummed sheet product suitable for use in sealing the folded flaps of cardboard cartons and exhibiting high adhesive strength and resistance to forces causing slippage in such sealing application, said sheet product being non-blocking when stored or shipped with the gummed coating of one sheet in contact with the back side of an adjacent sheet, and comprising a sheet backing member and a normally non-tacky gummed coating thereon, said coating being rapidly activated to tackiness by water-moistening and comprising by weight between 40 and 75% of high solubility dextrine exhibiting a solubility of at least 90% in water at 77° F., between 5 and 40% of acrylyl polymer selected from the group consisting of polyacrylic acid and polyacrylamide, and up to 55% of low solubility dextrine having a solubility less than 15% in water at 77° F., the combined amount of said acrylyl polymer and said low solubility dextrine in said coating being in the range of 25 to 60%, said dextrine and acrylyl polymer being uniformly blended in said gummed coating.

3. A flexible gummed sheet product exhibiting high adhesive strength and comprising a flexible fibrous sheet backing member and a normally non-tacky gummed coating thereon, the dry coating weight of said coating being from 5 to 15 pounds per ream, said coating being rapidly activated to tackiness by water-moistening and comprising by weight up to 95% of high solubility dextrine (a) exhibiting a viscosity below 50 centipoises Brookfield at 100° F. and 30% solids concentration in water and (b) exhibiting a solubility of at least 90% in water at 77° F., and between 5 and 40% of polyacrylic acid.

4. A flexible gummed sheet product exhibiting high adhesive strength and comprising a flexible fibrous sheet backing member and a normally non-tacky gummed coating thereon, the dry coating weight of said coating being from 5 to 15 pounds per ream, said coating being rapidly activated to tackiness by water-moistening and comprising by weight up to 95% of high solubility dextrine (a) exhibiting a viscosity below 50 centipoises Brookfield at 100° F. and 30% solids concentration in water and (b) exhibiting a solubility of at least 90% in water at 77° F., and between 5 and 40% of polyacrylamide.

5. As a new article of manufacture: a flexible gummed tape product in roll form with the gummed coating of one layer in contact with the back side of adjacent layers in the convolutions of the roll, said tape product exhibiting high adhesive strength and comprising a paper layer backing member and a normally non-tacky gummed coating thereon, the dry coating weight of said coating being from 5 to 15 pounds per ream, said coating being rapidly activated to tackiness by water-moistening and comprising by weight up to 95% of high solubility dextrine (a) exhibiting a viscosity below 50 centipoises Brookfield at 100° F. and 30% solids concentration in water and (b) exhibiting a solubility of at least 90% in water at 77° F., and between 5 and 40% of polyacrylic acid.

6. A flexible gummed sheet product suitable for use in sealing the folded flaps of cardboard cartons and exhibiting high adhesive strength and resistance to forces causing slippage in such sealing applications, said sheet product being non-blocking when stored or shipped with the gummed coating of one sheet in contact with the back side of an adjacent sheet, and comprising a sheet backing member and a normally non-tacky gummed coating thereon, said coating being rapidly activated to tackiness by water-moistening and comprising by weight between 40 and 75% of high solubility dextrine exhibiting a solubility of at least 90% in water at 77° F., between 5 and 40% of polyacrylic acid, and up to 55% of low solubility dextrine having a solubility less than 15% in water at 77° F., the combined amount of said polyacrylic acid and said low solubility dextrine in said coating being in the range of 25 to 60%.

7. As a new article of manufacture: a flexible gummed tape product suitable for use in sealing the folded flaps of cardboard cartons and exhibiting high adhesive strength and resistance to forces causing slippage in such sealing applications, said tape product being in roll form with the gummed coating of one layer in contact with the back side of adjacent layers in the convolutions of the roll, and said tape product being non-blocking in said roll form, and comprising a paper layer backing member and a normally non-tacky gummed coating thereon, said coating being rapidly activated to tackines by water-moistening and comprising by weight between 40 and 75% of high solubility dextrine exhibiting a solubility of at least 90% in water at 77° F., between 5% and 40% of polyacrylic acid and up to 55% of low solubility dextrine having a solubility less than 15% in water at 77° F., the combined amount of said polyacrylic acid and said low solubility dextrine in said coating being in the range of 25 to 60%.

8. A flexible gummed sheet product suitable for use in sealing the folded flaps of cardboard cartons and exhibiting high adhesive strength and resistance to forces causing slippage in such sealing applications, said sheet product being non-blocking when stored or shipped with the gummed coating of one sheet in contact with the back side of an adjacent sheet, and comprising a sheet backing member and a normally non-tacky gummed coating thereon, said coating being rapidly activated to tackiness by water-moistening and comprising by weight about 51% of high solubility dextrine exhibiting a solubility of at least 90% in water at 77° F., about 15% of polyacrylic acid, and about 34% of low solubility dextrine having a solubility less than 15% in water at 77° F.

9. A flexible gummed sheet product comprising a sheet backing member and a normally non-tacky gummed coating thereon, said coating being rapidly activated to tackiness by water-moistening and comprising by weight between 40 and 75% of high solubility dextrine exhibiting a solubility of at least 90% in water at 77° F., between about 10 and 25% of acrylyl polymer selected from the group consisting of polyacrylic acid and polyacrylamide, and between about 10 and 50% of low solubility dextrine having a solubility less than 15% in water at 77° F., the combined amount of said acrylyl polymer and said low solubility dextrine in said coating being in the range of 25 to 60%.

10. A flexible gummed sheet product exhibiting high adhesive strength and comprising a sheet backing member coated with a normally non-tacky gummed coating rapidly activatible to tackiness by water-moistening and comprising by weight between 40 and 75% of high solubility dextrine exhibiting a solubility of at least 90% in water at 77° F., between 5 and 40% of polyacrylic acid, and from 10% up to 55% of low solubility dextrine having a solubility less than 15% in water at 77° F., the combined amount of said polyacrylic acid and said low solubility dextrine in said coating being in the range of 25 to 60%.

References Cited in the file of this patent

UNITED STATES PATENTS

| | | |
|---|---|---|
| 2,183,736 | Bauer | Dec. 19, 1939 |
| 2,220,987 | Bauer et al. | Nov. 12, 1940 |
| 2,317,328 | Kinney | Apr. 30, 1943 |
| 2,365,020 | Stillwell | Dec. 12, 1944 |
| 2,791,512 | Hatch et al. | May 7, 1957 |
| 2,808,381 | Stone | Oct. 1, 1957 |

UNITED STATES PATENT OFFICE

CERTIFICATE OF CORRECTION

Patent No. 2,976,178            March 21, 1961

Walter H. Pahl et al.

It is hereby certified that error appears in the above numbered patent requiring correction and that the said Letters Patent should read as corrected below.

Column 1, line 52, for "molde" read -- molds --; line 61, for "materals" read -- materials --; column 3, line 45, for "containing" read -- contains --; column 5, line 51, for "carboard" read -- cardboard --; column 7, line 9, for "tackines" read -- tackiness --.

Signed and sealed this 26th day of September 1961.

(SEAL)
Attest:

ERNEST W. SWIDER            DAVID L. LADD
Attesting Officer            Commissioner of Patents

USCOMM-DC